United States Patent [19]

Bessho et al.

[11] Patent Number: 5,563,403
[45] Date of Patent: Oct. 8, 1996

[54] METHOD AND APPARATUS FOR DETECTION OF A SKEW ANGLE OF A DOCUMENT IMAGE USING A REGRESSION COEFFICIENT

[75] Inventors: Goroh Bessho, Yokohama; Koichi Ejiri, Narashino, both of Japan

[73] Assignee: Ricoh Co., Ltd., Tokyo, Japan

[21] Appl. No.: 355,902

[22] Filed: Dec. 14, 1994

[30] Foreign Application Priority Data

Dec. 27, 1993 [JP] Japan .................................. 5-331253

[51] Int. Cl.⁶ .................................................. H01J 40/14
[52] U.S. Cl. ...................... 250/208.1; 382/289; 382/290; 358/488
[58] Field of Search ........................... 250/208.1, 559.36, 250/559.37; 358/474, 488, 494; 382/289, 290, 278, 168, 171

[56] References Cited

U.S. PATENT DOCUMENTS

| | | | |
|---|---|---|---|
| 4,547,864 | 10/1985 | Kawabata | 382/278 |
| 4,558,461 | 12/1985 | Schlang . | |
| 4,941,189 | 7/1990 | Britt | 382/290 |
| 5,046,114 | 9/1991 | Zobel | 382/171 |
| 5,077,811 | 12/1991 | Onda | 382/290 |
| 5,280,544 | 1/1994 | Tanaka et al. | 382/171 |

FOREIGN PATENT DOCUMENTS 6-52354  2/1994  Japan .

OTHER PUBLICATIONS

"Document Image Segmentation and Text Area Ordering", Takashi Saitoh, et al., IEEE Computer Society Press Reprint, Oct. 20–22, 1993, pp. 323–329.

"Fast and Accurate Skew Detection Algorithm for a Text Document or a Document with Straight Lines", Goroh Bessho, et al., SPIE vol. 2181 Document Recognition (1994), pp. 133–140.

"Fast Skew Correction of a Printed Document", Koichi Ejiri, Proceedings of the Institute of Image Electronic Engineers of Japan, Jun. 8, 1993.

Primary Examiner—Georgia Y. Epps
Assistant Examiner—Jacqueline M. Steady
Attorney, Agent, or Firm—Oblon, Spivak, McClelland, Maier & Neustadt, P.C.

[57] ABSTRACT

A method and apparatus for detecting the skew angle of a document image. Skew angle determination is performed by the steps of determining a set of sampling points from an input document image and processing X and Y coordinates of the sampling points in order to calculate a regression coefficient of the sampling points. The skew angle of the document is determined using the regression coefficient. To evaluate a calculated skew angle which corresponds to the regression coefficient, a correlation coefficient is calculated and evaluated. As coordinates of sampling points are obtained for a plurality of sets of data corresponding to different ruled lines or lines of characters, a histogram may be used to determine the most probable skew angle.

28 Claims, 10 Drawing Sheets

METHOD AND APPARATUS FOR DETECTION OF A SKEW ANGLE OF A DOCUMENT IMAGE USING A REGRESSION COEFFICIENT

BACKGROUND OF THE INVENTION

1. Field of the Invention

This invention relates to the field of document processing systems, such as copying machines, facsimile machines or Optical Character Recognition ("OCR") systems. The invention particularly relates to a method and apparatus for detecting a skew angle of a document image.

2. Description of the Related Art

Bit-mapped images of a document handled by a document processing system, such as a digital copying machine, a facsimile machine, or an image scanner, are becoming more popular in the office. In these systems, skew or tilt of the document image produces undesirable results. Furthermore, skew or tilt of a document reduces a recognition accuracy of an OCR system.

To remove document skew, it is first required to accurately detect the skew of the document image. A paper presented by M. Hase and Y. Hoshino entitled "Periodic Characteristics in Printed Documents" published in the Transactions of Japanese Institution of Electronics and Communication Engineer, '82/2 Vol J65-D No. 2, provides a method which utilizes a two-dimensional Fourier Transform. In this method, character lines of a document image were determined. When the character lines are equally spaced and aligned in parallel, a result of the two-dimensional Fourier Transform of the document image data showed a maximum value which is perpendicular to the direction of the character lines. However, this method is not very sensitive at estimating the skew angle of the document and comes with high computational cost.

Another method was presented by Japanese Laid-Open Patent Application Publication 2-116987 (1990). This publication discloses the detection of skew angle utilizing the Hough Transform after detection of a character and character lines from an input image. However, the above-mentioned technology has been made on the premise of the practice of detection of a character and character lines in input images. Therefore, this technique is not able to detect skew of a document which has no character lines. Further, the Hough Transform requires extensive computation time, and is found not to be sufficiently sensitive enough to the skew angle.

SUMMARY OF THE INVENTION

Accordingly, one object of this invention is to provide a novel method and apparatus for fast and accurate detection of skew angle of a document image. A further object of this invention is to present a more general method and apparatus for document image processing systems which process a document image having ruled lines included in charts, tables, and other portions of the document in addition to the textual portion of the document.

Skew angle determination in the present invention is generally performed by the steps of determining a set of sampling points from connected black runs from ruled lines of a binary document image, processing X and Y coordinates of these sampling points in order to determine a regression coefficient of the sampling points, and determining the skew angle of the document using the regression coefficient. Lines of a document are decomposed into small segments of connected black runs of pixels. By checking the connection of black runs in the image, the present invention detects whether or not the black runs belong to the same scanning line. In the present invention, to remove any bad effect from variation in line width, the invention takes a plurality of sampling points of the input image with respect to a number of different X and Y coordinates along the black runs which are adjacent to white pixels.

A regression coefficient is then determined using the sampling points. A skew angle is accurately determined based on a line which is defined by the regression coefficient. Since skew angle determination of the present invention is based on the coordinate data of the sampling points, the present invention can determine the skew angle of the document in less computation time. If a ruled line does not exist or a satisfactory result is not achieved using ruled lines, coordinates using characters are used in order to determine the skew angle.

The coordinates of the sampling points are used to calculate a correlation coefficient which is utilized to find the correlation value of the regression line. The accuracy of the regression coefficient and skew angle are evaluated using the correlation coefficient. As the invention may evaluate a number of ruled lines or character lines, a plurality of calculations are performed which each indicate a calculated skew angle. A histogram, or a weighted histogram using the correlation coefficient, may be created in order to determine a final skew angle of the document.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
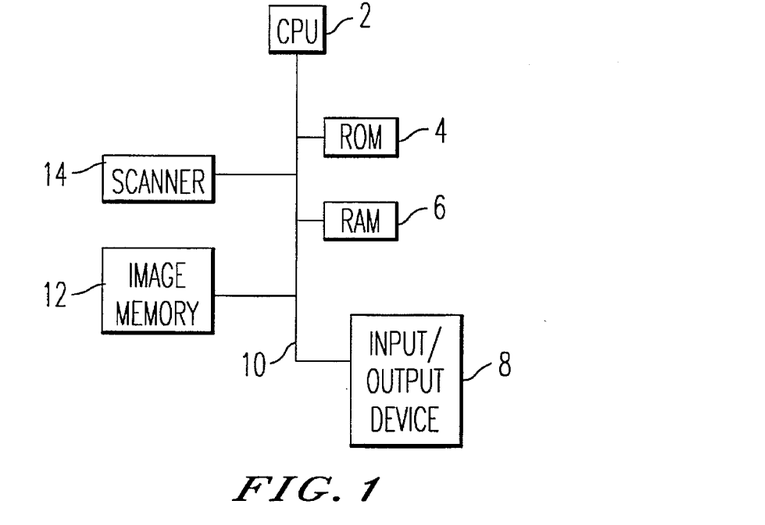
FIG. 1 illustrates a hardware embodiment of the present invention.

Referring now to the drawings, wherein like reference numerals designate identical or corresponding parts throughout the several views, and more particularly to FIG. 1 thereof, there is illustrated an exemplary hardware embodiment of the present invention. A CPU 2 which may be any known microprocessor performs calculations used to determine the skew angle. A ROM 4 stores the program used to calculate the skew angle and other programs associated with the operation of the invention. A RAM 6 stores information used during the process of determining the skew angle including information pertaining to black runs of pixels and other information regarding ruled lines, information pertaining to character lines, the regression coefficient after it is calculated, the correlation coefficient after it is calculated, the histogram, and other information pertaining to the calculation of the skew angle. The input/output device 8 is used to enter commands into the system and to display data to a user. A keypad or keyboard can be used to enter commands and any type of display can be used to output information including a liquid crystal display, a light emitting diode display, or a CRT. All elements illustrated in FIG. 1 are connected by a system bus 10. An image memory 12 is used to store a scanned image either in its original or compressed form. The image memory 12 may be a semiconductor memory such as a RAM or a hard disk. A scanner 14 is used to obtain a binary digital representation of a document and includes conventional components of a scanner such as a light source to illuminate the document to be scanned, a CCD used to determine the image of the document being scanned, and other components found in a conventional scanner.

As an alternative to the hardware embodiment illustrated in FIG. 1, the invention may be embodied in a Programmable Logic Array ("PLA") or other special purpose ciruitry. Additionally, the present invention processes and transforms electrical signals including digital signals during scanning of the document and the determination of the skew angle.

Before describing the process of the invention in detail, information regarding the skew of a document will be given. Skew is a problem which refers to document images wherein the lines of text do not lie on a horizontal line (i.e., the image is tilted). The skew or tilt angle determination which is performed by the present invention utilizes a regression coefficient which is detected using the input image. The present invention can be implemented as part of any document processing system or any device utilizing image scanning such as a digital copying machine, a facsimile machine, a scanner, etc. In the present writing, well-known components such as the image scanning technique or a binarization technique of the image data have not been shown or described in detail in order to avoid unnecessarily obscuring the present invention.

The present invention determines a skew angle by evaluating a series of related points of a document. These points can be from either a ruled line such as a line found in a table, chart, or underlining of characters, or can be coordinates of the characters themselves. Processing using ruled lines is quicker than when characters are used. Therefore, if ruled lines exist and result in an accurate determination of the skew angle, it is not necessary to use characters in order to evaluate the skew or tilt angle of an image of a document. The manner of obtaining coordinate data for both ruled lines and character lines is known and disclosed in the publication "Document Image Segmentation and Text Area Ordering," by T. Saitoh et al from the Proceedings of the Second International Conference on Document Analysis and Recognition, Tsukuba Science City, Japan, Oct. 20–22, 1993, reprinted in the IEEE Computer Society Press Reprint which is incorporated herein by reference. However, alternative methods of determining coordinate data can be used in order to determine the skew angle.

It is to be noted that after an image is scanned, the image can be compressed in both the X and Y directions in order to reduce the amount of data which must be processed in order to obtain the coordinate data used to determine the skew angle.

Figure 2A:
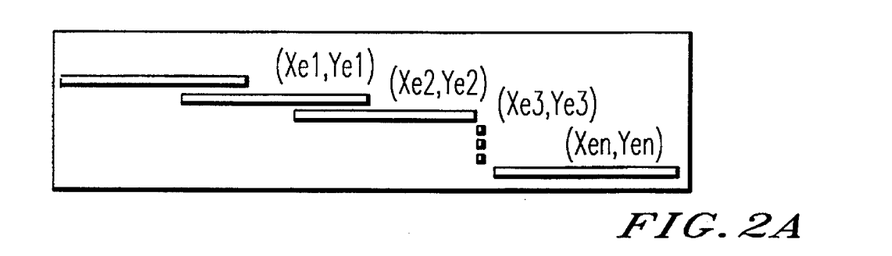
FIGS. 2A and 2B illustrate connected black runs of pixels from ruled lines which are used in order to determine the skew angle.
Figure 2B:
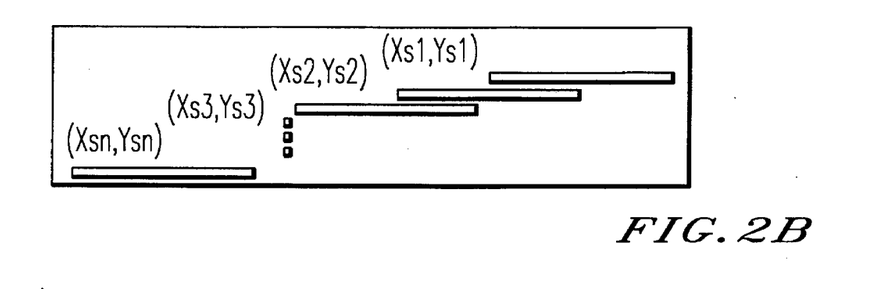

FIGS. 2A and 23 respectively illustrate ruled lines which slope downwardly from left to right and upwardly from left to right respectively. Each black segment illustrated in these figures illustrates a connected run of black pixels. When evaluating a ruled line, the coordinate sampling points are obtained by checking black run lengths in a horizontal direction of the input image. If successive black pixels exceed, for example, 32 pixels, a portion of a ruled line is detected. The threshold is typically set based on the largest character size of the input document image.

The coordinate data illustrated in FIG. 2A (Xe1, Ye1) through (Xen, Yen) are the rightmost coordinates of the connected runs of black pixels. If the line slopes upwardly when proceeding to the right of the document, the coordinates (Xs1, Ys1) through (Xsn, Ysn) which are the leftmost points of the connected runs of black pixels may be used. The coordinate data which is associated with the ruled lines is at transition position from a black pixel of a ruled line to a white pixel.

If an insufficient number of connected black pixels were found or the correlation coefficient which is ultimately determined using the black runs of pixels is too small (e.g. less than 0.8), then ruled lines do not exist or do not provide a sufficient basis for determining the skew angle and characters are used in order to determine the skew angle of the document.

Figure 3:
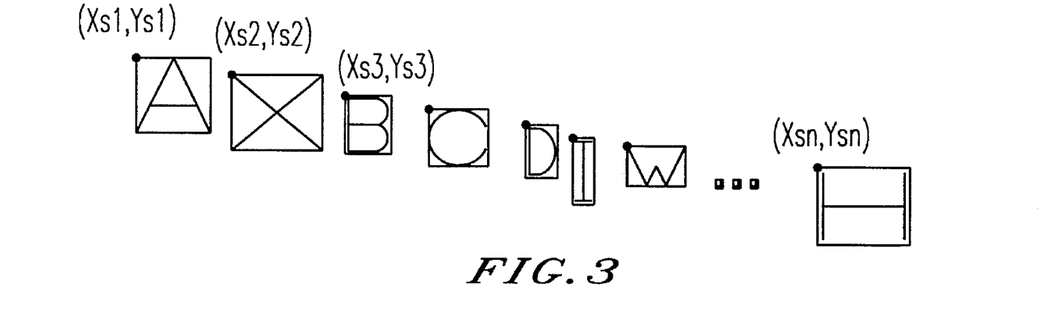
FIG. 3 illustrates the coordinates of characters which are used in order to determine the skew angle of the document.

In FIG. 3, rectangles are drawn around the characters of a line such as the characters A, X, B, C, D, I, W . . . H. The coordinate of the upper left-hand corner of these characters may be used in order to determine the coordinate data used to determine the skew angle. In FIG. 3, the coordinate data used would be (Xs1, Ys1) through (Xsn, Ysn).

Figure 4:
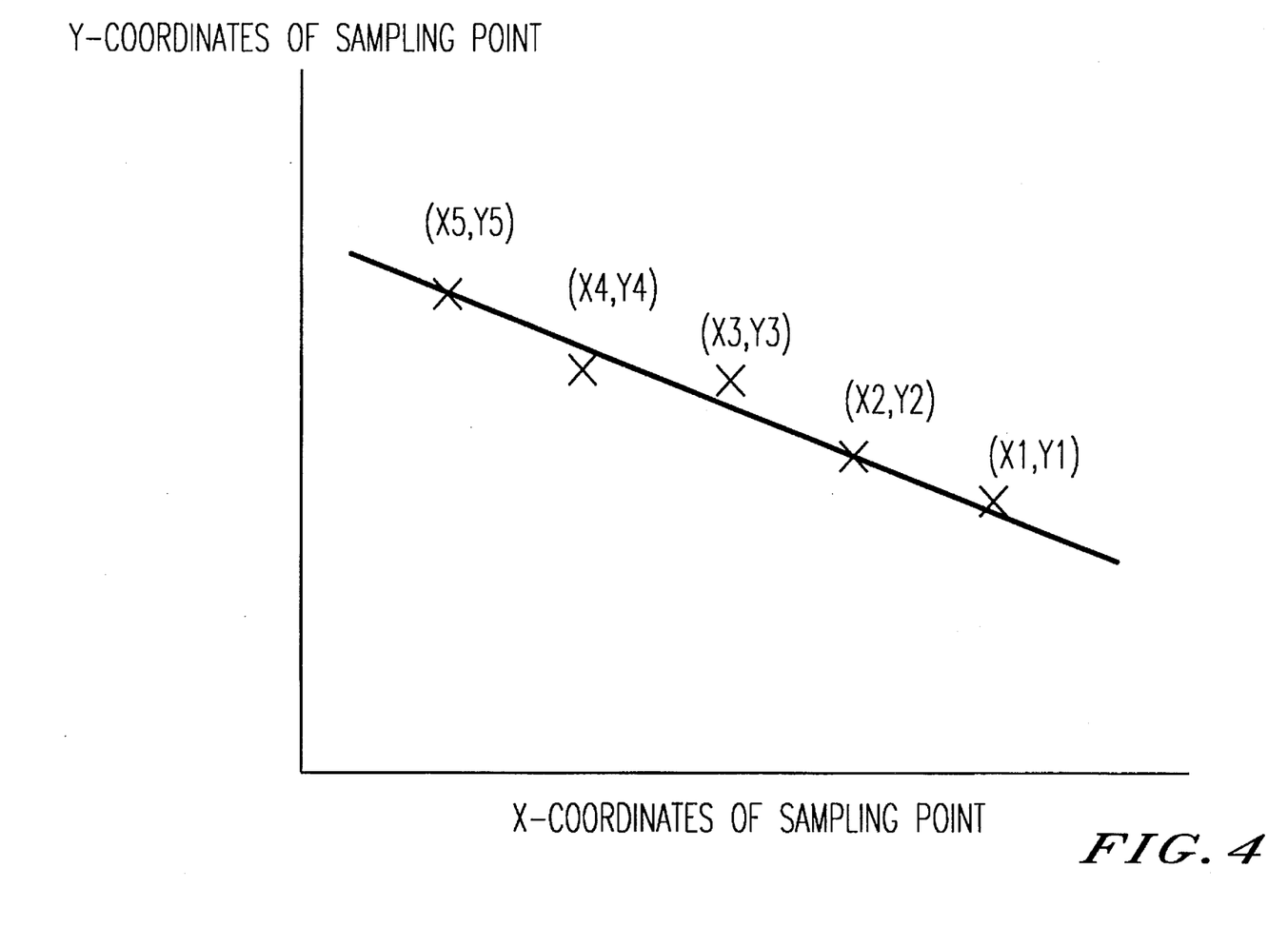
FIG. 4 illustrates a regression line which has been determined using sampling points.

The coordinate data obtained using either ruled lines or character lines is then used to determine a regression line as illustrated in FIG. 4. This regression line is defined by the regression coefficient. The skew angle is then determined using this regression coefficient, as explained below.

A series of equations is used to determine the skew angle of the document. The same equations are used for both ruled line and character coordinate data. An explanation of these equations will be given below.

A regression coefficient b which is calculated in order to determine a ruled line is defined as $$b = \frac{Sxy}{Sx} \quad (1)$$

where $$Sx = \sum_{i=1}^{n}(x_i - \bar{x})^2 = \sum_{i=1}^{n} x_i^2 - \left(\sum_{i=1}^{n} x_i\right)^2 / n \quad (2)$$

$$Sy = \sum_{i=1}^{n}(y_i - \bar{y})^2 = \sum_{i=1}^{n} y_i^2 - \left(\sum_{i=1}^{n} y_i\right)^2 / n \quad (3)$$

$$Sxy = \sum_{i=1}^{n}(x_i - \bar{x})(y_i - \bar{y}) = \quad (4)$$

$$\sum_{i=1}^{n} x_i y_i - \left( \sum_{i=1}^{n} x_i \right) \left( \sum_{i=1}^{n} y_i \right) / n$$

The quantities Sx, Sy and Sxy are the summations of squared differences relating to coordinate data of the sampling points. It is to be noted that Sy is not used above to determine the regression coefficient but is used below to determine the correlation coefficient.

Once the regression coefficient b is found, the skew angle Θ is defined as $$\tan\Theta = b \tag{5}$$

The correlation coefficient r is calculated as follows:

$$r = \frac{Sxy}{\sqrt{SxSy}} \tag{6}$$

The correlation coefficient indicates the dispersion of the regression coefficient. A correlation coefficient of 1.0 indicates the regression coefficient has a monotonous characteristic and the regression line would be a straight line having the coordinate data previously obtained. A high correlation coefficient near 1.0 indicates the regression coefficient correctly represents the skew angle of the document correctly. On the other hand, if the correlation coefficient is low or dispersed (near zero), the probability of determining a correct skew angle of the document is low.

Figure 5A:
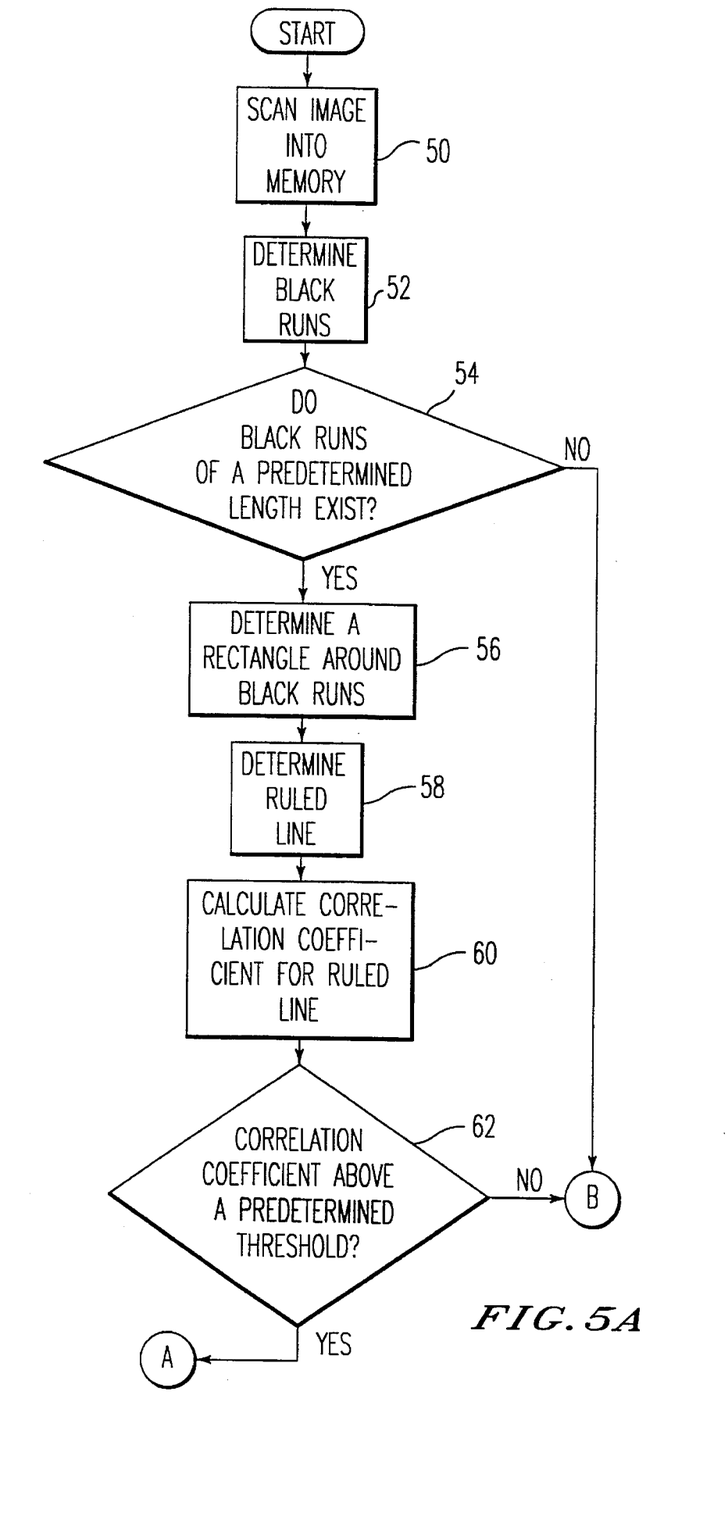
FIGS. 5A and 5B illustrate a flowchart showing the overall process of the present invention.
Figure 5B:
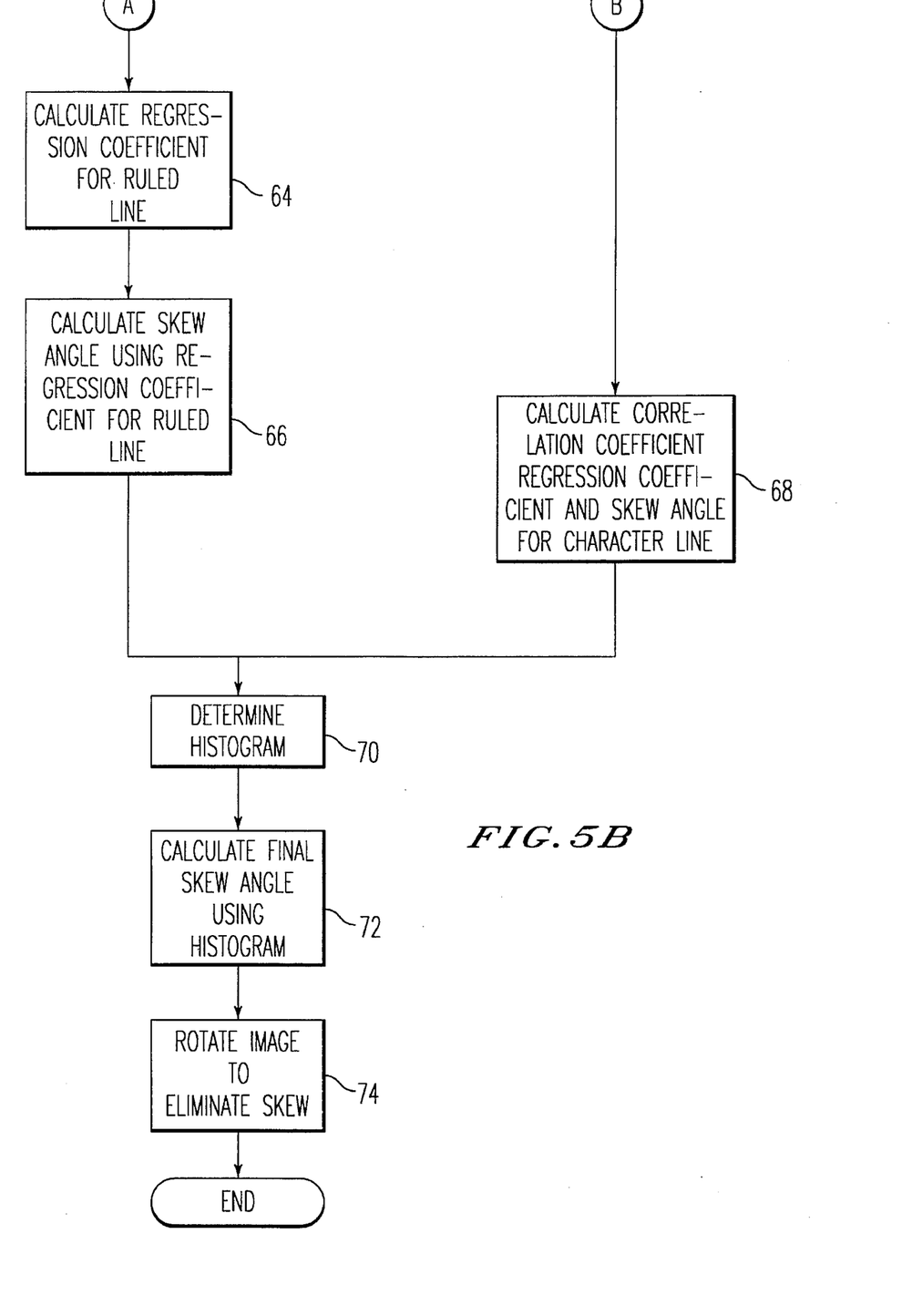

FIGS. 5A and 5B illustrate the general process used by the present invention. After starting in FIG. 5A step 50 scans the image into memory. This step performs an ordinary scanning of a document using a conventional scanner. The document may be illuminated by a light source such as a light bulb and the image of the document detected using a conventional Charge Coupled Device ("CCD"). If desired, the scanned image may be compressed in both the X and Y directions of the document. The amount of compression can be different in each of the directions, if desired. The image compression reduces the amount of data which must be processed because fewer pixels need to be examined in order to evaluate the skew angle of the document.

Step 52 determines the black runs of pixels (connected black pixels) within the document. Step 54 evaluates the black runs determined in step 52 in order to see if there are ruled lines. The predetermined length may be, for example, 32 pixels.

If step 54 determines that black runs of a predetermined length exist, step 56 constructs a black rectangle around the black runs as illustrated in FIGS. 2A and 2B. The purpose of constructing the rectangle is so that the coordinate data of one ruled line will be obtained. For example, in FIG. 2A, there is illustrated coordinate data for one ruled line contained within the illustrated rectangle. In step 58, the ruled line or coordinates thereof are determined using the coordinate data within the rectangle.

Step 60 calculates the correlation coefficient r for a ruled line using Equation 6. Step 62 examines the correlation coefficient to determine if it is above a predetermined threshold. If the correlation coefficient for the ruled line is above a predetermined threshold, it means that the coordinate data obtained from the scanning process is sufficient to use the ruled line in order to determine the skew angle of the document. If it is below the predetermined threshold, character coordinate data must be used and flow proceeds to process B of FIG. 5A. The present inventors have determined that 0.8 is a good position at which to set the cut off for the correlation coefficient in step 62.

If the correlation coefficient is above 0.8 in step 62, flow proceeds to process A in FIG. 5B where the regression coefficient b is calculated in step 64 according to Equation 1. The skew angle θ is calculated in step 66 using Equation 5.

If sufficient black runs of a predetermined length are determined not to exist in step 54 or the correlation coefficient for the ruled lines is insufficient in step 62, step 68 of FIG. 5B calculates the correlation coefficient, regression coefficient, regression coefficient, and skew angle using character coordinate data and Equations 6, 1 and 5 respectively.

Figure 6:
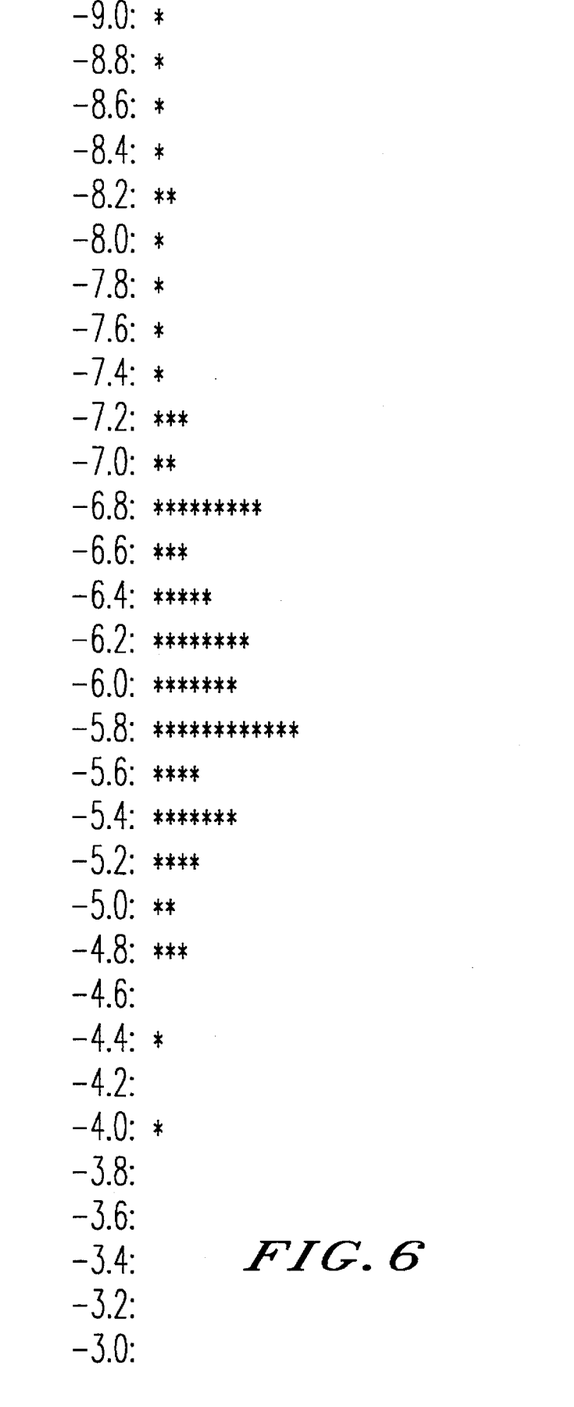
FIG. 6 illustrates a histogram which is used to determine the final skew angle of the document.

In order to accurately determine the skew angle, a number of sets of coordinate data from ruled lines or characters are used in order to determine a calculated skew angle for each of the sets of data. A histogram may be generated, as illustrated in FIG. 6, which is explained below, in order to determine a final skew angle from a plurality of sets of data. Alternatively, a weighted histogram may be used in which a weight is assigned to each determined angle using the correlation coefficient in order to more accurately calculate the skew angle.

After all data is processed and the histogram is generated, step 72 evaluates the histogram to determine the final skew angle used for the document. If desired, step 74 rotates the document by an amount equal to the skew angle in order to eliminate the skew by a conventional and known image rotation process.

It is to be noted that the process of the invention described in FIGS. 5A and 5B indicates that the skew angle is calculated for each set of data. However, in actual construction of the system, it is only necessary to determine the correlation coefficient and the regression coefficient for each set of coordinate data. The regression coefficient is used to determine the histogram. After the histogram is constructed, a final regression coefficient is selected and the final skew angle can be determined using the final regression coefficient. This manner of operation eliminates the need to calculate the skew angle for each set of coordinate data and the skew angle will only have to be calculated once for each document image.

FIG. 6 illustrates a typical histogram obtained by the present invention. Each time a skew angle is detected, a star is placed in the entry for the corresponding detected angle. Alternatively, a weighted histogram can be calculated as discussed below. In FIG. 6, noisy narrow peaks such as −6.8° are ignored by adding neighboring frequencies. This histogram illustrated in FIG. 6 indicates that the detected skew angle of the document is −5.8°. The methods of generating and using histograms are known and the details thereof are not given.

While the ruled lines which the invention is illustrated as processing are horizontal, the invention is equally applicable to vertical lines also. Therefore, the method of the invention is equally applicable to the subscan direction of the image and the main scan direction of the image.

The present invention may compress the scanned image data before the skew angle is determined. The data may be compressed by an OR operation. For example, if an image is compressed 8×8 in the X and Y directions respectively, if one pixel is black in an 8×8 original pixel area, this pixel may be considered black in the compressed image. The present invention is equally applicable for high density binary images such as a 400 dpi (dot per inch) but is also applicable to low density binary images such as a binary rectangle image which is the result of a compression operation of a high density binary image.

The operation of the invention will now be explained with respect to FIGS. 7–10 which respectively illustrate four functional block diagrams of the invention. The elements illustrated in these figures correspond to the hardware illustrated in FIG. 1.

Figure 7:
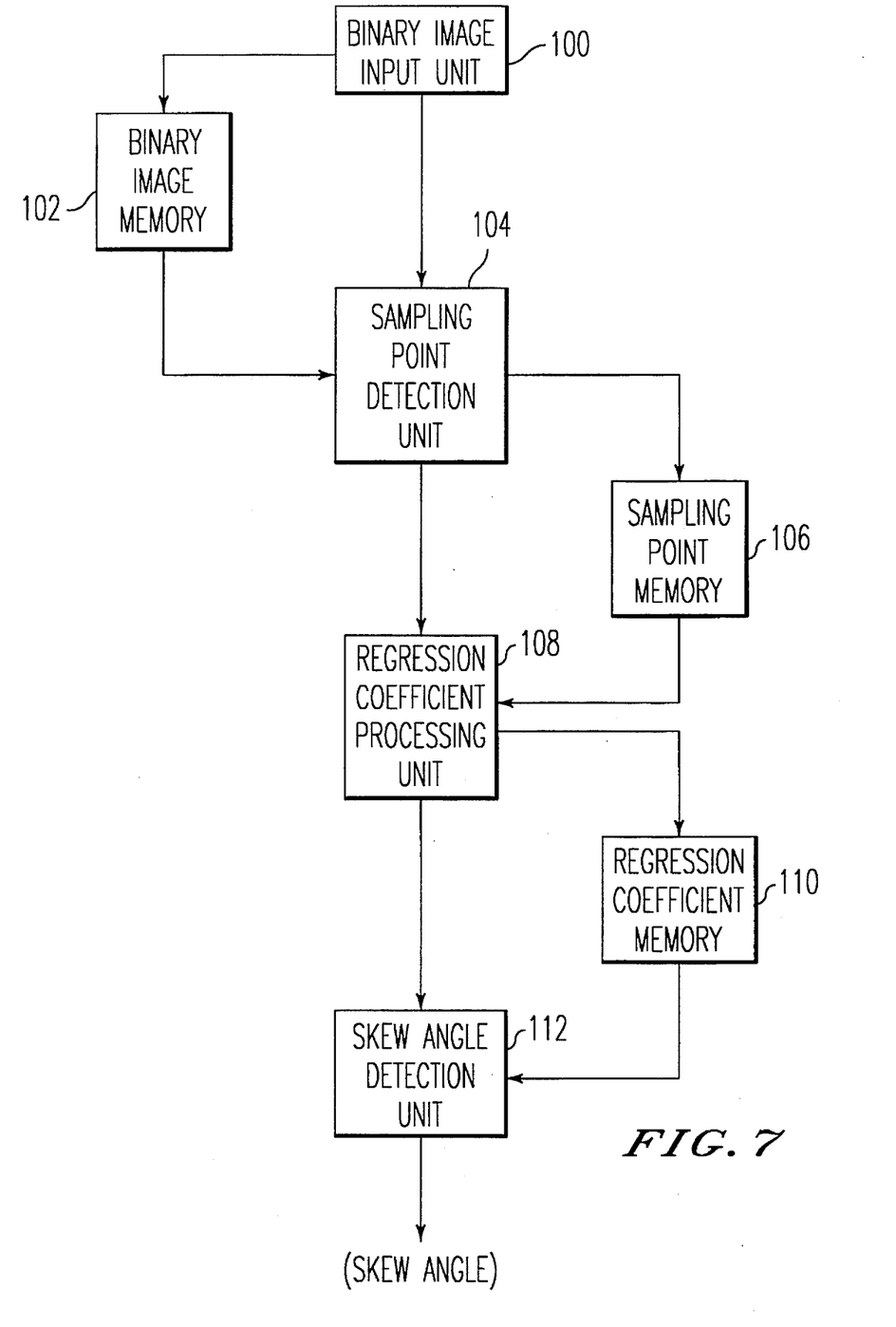
FIG. 7 illustrates a first functional block diagram of the present invention.

FIG. 7 illustrates a first functional block diagram embodiment of the invention. A binary image input unit 100 such as an image scanner having a CCD acquires a binary image of an original document. The data acquired by the binary image input unit 100 is stored in binary image memory 102. A sampling point detection unit 104 detects a plurality of edges of binary image data as sampling points. The sampling points are boundary points between black and white pixels. The detection is accomplished by the CPU by searching the image data stored in the binary image memory 102 and extracting a memory address of boundary points.

The present invention handles separately coordinate data defining character lines and ruled lines as explained above. In the present writing, a ruled line is an underline of text or segment in a chart or table which is a straight line. Generally, character lines are systematically arranged in a document image.

The detection unit 104 detects coordinate data based on rectangles of connected black pixels. Each rectangle is the boundary of a set of connecting pixels that form a word or character. The process to obtain a rectangle of connected black pixels is known in the art of document image processing. For example, the process used to obtain rectangles for both ruled lines and character lines is disclosed in the above-described paper by Saitoh et al entitled "Document Image Segmentation and Text Area Ordering" which is incorporated herein by reference.

When coordinated data exist for a ruled line, the detection unit 104 determines a plurality of sampling points by checking black run-lengths in a horizontal direction of the input image. If a run-length which represents successive black pixels is longer than the predetermined threshold (L), the detection unit 104 determines the component of black pixels as elements of a ruled line and chooses the last for first pixel of the components of the black run as a sampling point. The threshold (L) is typically determined by the value based on the largest character size according to the input document image and may be 32, for example. The detection of the coordinates of the sampling points is performed for each scan line.

The detection unit 104 examines coordinates of pixels of a ruled line. The ruled line enables a quicker and more accurate determination of the skew angle as compared to character data, although the ruled line does not exist in every document. When a ruled line slants downward and to the right, the detection unit 104 uses the last pixel of the segment in each scanning line as illustrated in FIG. 2A. Alternatively, when the ruled line slants upwardly to the left, the first pixel of each black run is used. When a black run-length is longer than the predetermined threshold such as twice as long as the predetermined threshold, then each Lth pixel is sampled from the input image. This may remove bad data due to variations in line width. The coordinate data of extracted ruled lines are stored in the sampling point coordinate memory 106.

When the ruled lines do not exist or do not provide sufficiently correlated information, character data may be used to determine the sampling points, as described above. When data is obtained from character lines, the detection unit 104 detects the sampling point which has the smallest X coordinate in the first scan line as the sampling point for each character rectangle. In other words, the first pixel of the first line of each character rectangle is labelled as a sampling point by the detection unit 104.

The coordinate data of the sampling points is stored in the sampling point coordinate memory 106. The regression coefficient detection unit 108 calculates a regression coefficient of the sampling points using the above-described Equation 1. The regression coefficient is stored in regression coefficient memory 110 and the skew angle is calculated using the above-described Equation 5. The above-described process allows the present invention to quickly obtain a skew angle with a low computing cost.

Figure 8:
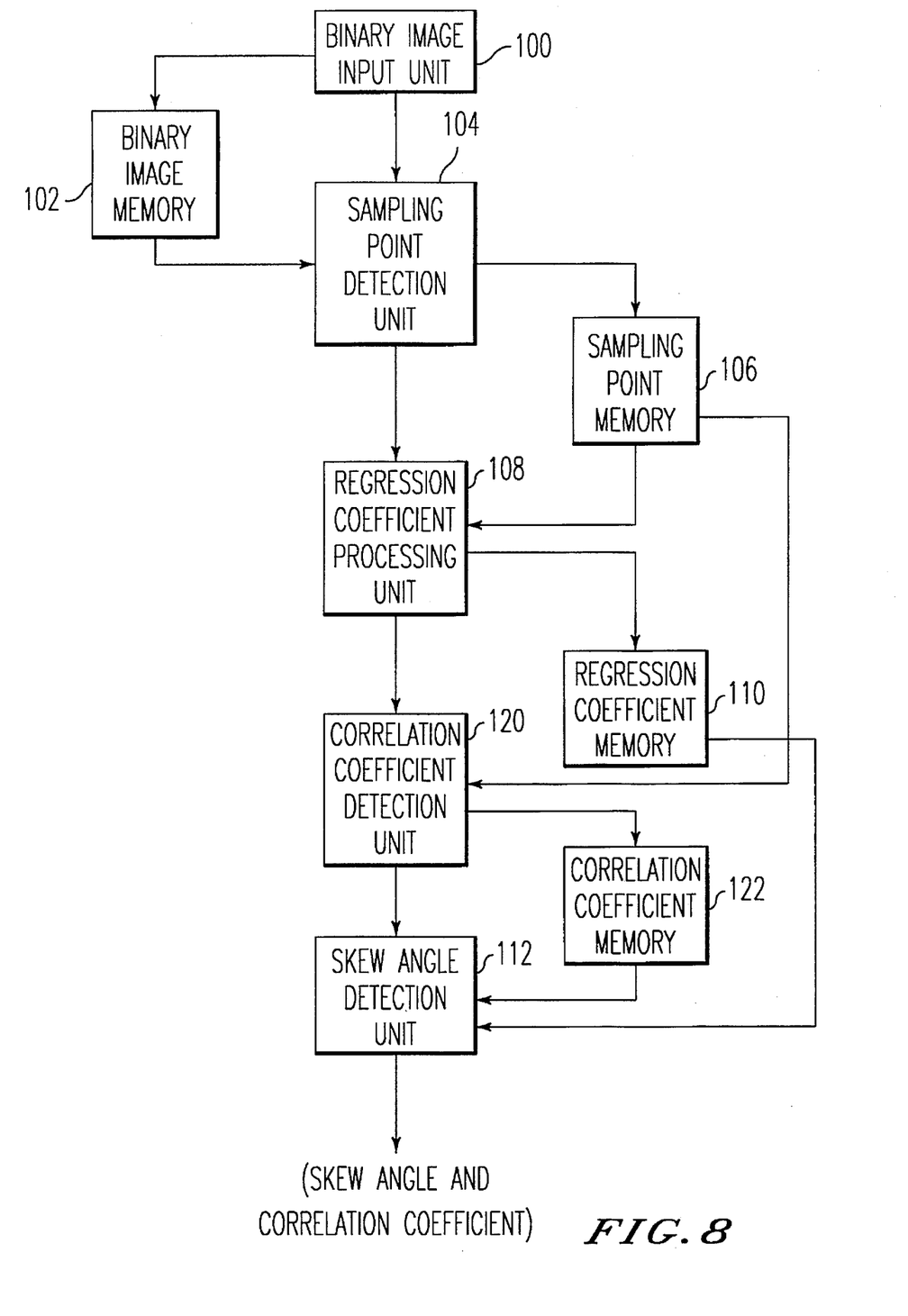
FIG. 8 illustrates a second functional block diagram of the present invention which contains a correlation coefficient detection unit.

A second embodiment of the invention is described in the functional block diagram of FIG. 8. In this embodiment, there is an evaluation of the regression coefficient using a correlation coefficient.

The same or similar components illustrated in FIG. 8 contained in FIG. 7 will not be described for brevity's sake. In FIG. 8, a correlation coefficient detection unit 120 reads out the coordinate data of the sampling points stored in the sampling point coordinate memory 106. The correlation coefficient detection unit 120 calculates the correlation coefficient r for the stored sampling points using the above-described Equation 6. The correlation coefficient indicates the dispersion of the regression coefficient. A correlation coefficient near 1 indicates that the detected coordinate data fall on the same line and therefore, the skew angle should be accurate. If the correlation coefficient is near zero, it is probable that the coordinate data has not been properly gathered or grouped and therefore, the calculated skew angle may not be accurate. The output of the process illustrated in FIG. 8 is the detected skew angle and the correlation coefficient indicating the accuracy of the detected skew angle. When a plurality of sets of coordinate data are used and therefore a plurality of skew angles are calculated, the correlation coefficient may be used in order to determine the most probable skew angle of the document.

Figure 9:
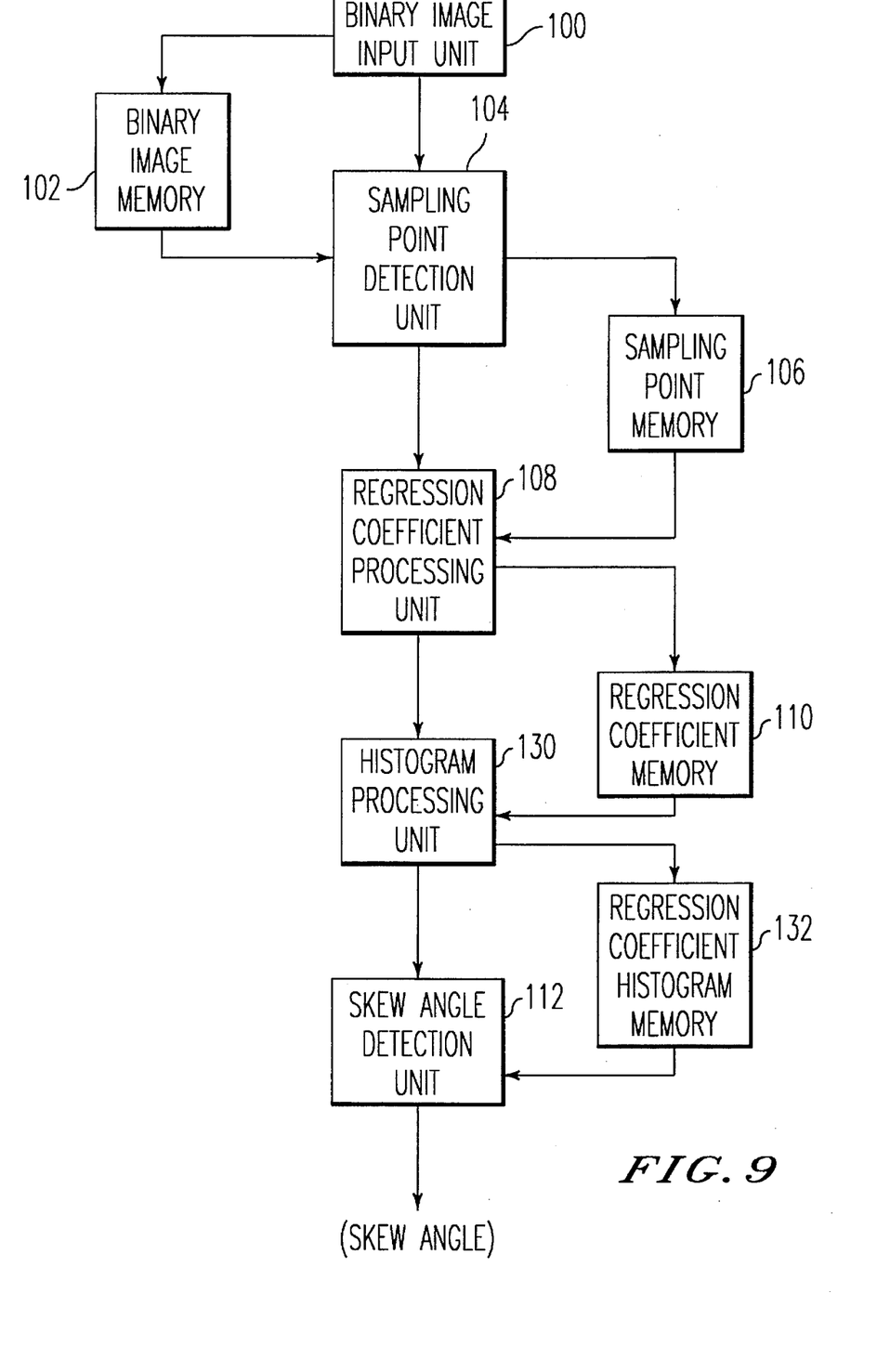
FIG. 9 illustrates a third functional block diagram of the present invention including a histogram arithmetic unit.

A functional block diagram of a third embodiment of the invention is illustrated in FIG. 9. In FIG. 9, there is a histogram processing unit 130 which determines a histogram such as the histogram illustrated in FIG. 6. The histogram information is stored in the regression coefficient histogram memory 132. The skew angle detection unit 112 reads out the information from the regression coefficient histogram memory and outputs the calculated skew angle which corresponds to the peak value of the regression coefficient histogram. This embodiment is particularly effective for documents containing variations such as various size fonts or noise in an original image. This embodiment does not use the correlation coefficient but instead uses the histogram to determine the skew angle which has the highest probability of matching the skew angle of the scanned document.

Figure 10:
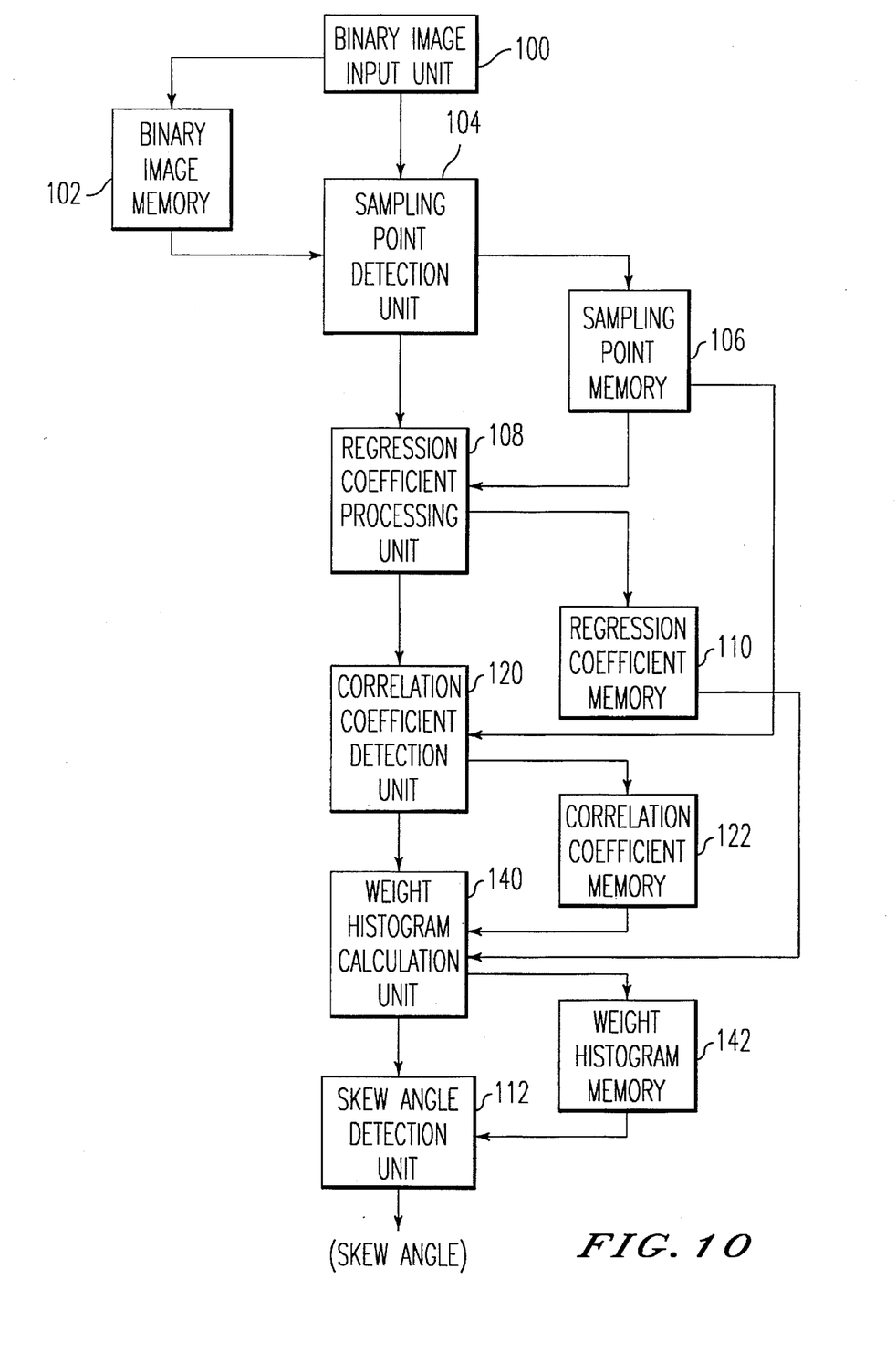
FIG. 10 illustrates a fourth embodiment of the present invention including a weighted histogram arithmetic unit.

A functional block diagram of a fourth embodiment of the invention is illustrated in FIG. 10. In FIG. 10, a weight histogram arithmetic calculation unit 140 reads out a regression coefficient and a correlation coefficient from the regression coefficient memory 110 and the correlation coefficient memory 122 respectively. The weighted histogram arithmetic unit makes a histogram of the regression coefficient multiplied with the correlation coefficient for each occurrence of the regression coefficient in order to give the regression coefficient (and corresponding angle) a weight which is proportional to a probability that it is correct. This obtains an improved histogram as compared to the previous embodiment.

The skew angle detection unit reads out the data from the weight histogram memory 142 and detects the final skew angle of the document based on a peak value of the weighted histogram. As an alternative to constructing the histogram using the regression coefficient, a histogram can be calculated for each skew angle and then a final skew angle determined using the weighted histogram.

Figure 11:
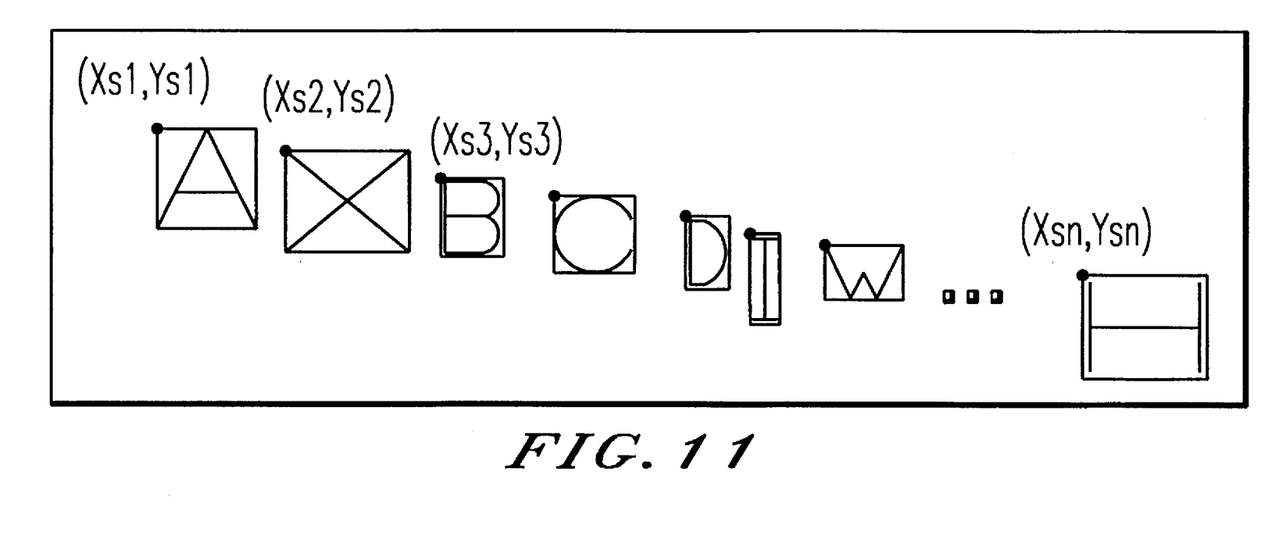
FIG. 11 illustrates a rectangle constructed around characters in a document.

A variation of determining the coordinate data for character lines will now be explained with respect to FIG. 11. FIG. 11 illustrates character data similar to the data illustrated in FIG. 3 except a rectangle has been drawn around the data. The detection unit 104 can set this rectangle which includes all connected rectangles containing black pixels in a direction of a predetermined scan line of the original binary document image. The detection unit 104 may extract sampling points from within this rectangle which correspond to the coordinates of the smaller rectangles within the larger rectangle. This process may be repeated throughout the original image with the regression coefficient being determined as described above using the coordinate data of the smaller rectangles within the large rectangle.

A second variation regarding the sampling of data relates to the compression ratio at which the data is used. Before obtaining the coordinates of the sampling data, the original image may be compressed in the main scanning and sub-scanning direction. If the document is written sideways, the main scan compression may be greater than the subscan direction. By using compression, the rectangles of the compressed image can be easily used to extract character coordinate data. This compression allows documents having character lines with a narrow pitch to be easily handled.

Obviously, numerous modifications and variations of the present invention are possible in light of the above teachings. It is therefore to be understood that within the scope of the appended claims, the invention may be practiced otherwise than as specifically described herein. Further the present invention is also described in the publication entitled, "Fast and Accurate Skew Detection Algorithm for a Text Document or a Document with Straight Lines" by Bessho et al., SPIE Vol. 2181 Document Recognition (1994) pp. 133–140, which is incorporated herein by reference.

What is claimed as new and is desired to be secured by letters patent of the United States is:

1. A method for detecting a skew angle, comprising the steps of:

scanning a page of a document and generating a document image;

determining sampling points of the document image using ruled lines of the document image;

calculating a regression coefficient of the sampling points; and determining the skew angle of the document image using said regression coefficient.

2. A method as recited in claim 1, further comprising the steps of:

calculating a correlation coefficient using the sampling points; and evaluating the regression coefficient using the correlation coefficient of said sampling points.

3. A method as recited in claim 1, wherein said step of determining a skew angle comprises:

calculating a histogram using a plurality of calculated regression coefficients; and determining the skew angle using the calculated histogram.

4. A method as recited in claim 3, further comprising the step of:

calculating a correlation coefficient of a plurality of sets of sampling data using the sampling points;

wherein the step of calculating the histogram calculates a weighted histogram using the correlation coefficients of the plurality of sets of sampling points.

5. A method as recited in claim 1, wherein the scanning step includes:

irradiating the page of the document with a light source.

6. A method as recited in claim 1, wherein the step of determining sampling points determines sampling points which are located at a boundary of a black pixel and a white pixel of the document image.

7. A method as recited in claim 1, wherein said step of determining sampling points determines the sampling points using characters of the document image.

8. A method for detecting a skew angle, comprising the steps of:

scanning a page of a document and generating a document image;

determining if at least a predetermined number of adjacent pixels forming a ruled line exist;

when at least the predetermined number of adjacent pixels forming a line are determined not to exist, performing the steps of:

determining sampling points using characters of the document image;

calculating a regression coefficient using the determined sampling points; and calculating a skew angle using the regression coefficient.

9. A method according to claim 8, wherein when at least the predetermined number of adjacent pixels forming a line are determined to exist, performing the steps of:

determining sampling points of a ruled line of the document image which correspond to the adjacent pixels;

calculating a regression coefficient using the determined sampling points of the ruled line; and calculating a skew angle using the regression coefficient calculated using the sampling points of the ruled line.

10. A method according to claim 9, further comprising, which are performed after the step of determining the sampling points of the ruled line, the steps of:

calculating a correlation coefficient using the determined sampling points of the ruled line;

determining if the correlation coefficient is less than a predetermined threshold;

performing the steps which are performed when at least the predetermined number of adjacent pixels forming a line are determined not to exist, when the correlation coefficient is determined to be less than the predetermined threshold.

11. A method according to claim 10, wherein the steps of calculating the regression coefficient using the determined sampling points of the ruled line and the calculating the skew angle using the regression coefficient calculated using the sampling points of the ruled line are performed only when the correlation coefficient is determined to be greater than or equal to the predetermined threshold.

12. A system for detecting a skew angle, comprising:

means for determining sampling points of a document image using ruled lines of the document image;

means for calculating a regression coefficient of the sampling points; and means for determine the skew angle of the document image using said regression coefficient.

13. A system as recited in claim 12, further comprising:

means for calculating a correlation coefficient using the sampling points; and means for evaluating the regression coefficient using the correlation coefficient of said sampling points.

14. A system as recited in claim 12, wherein said means for determining a skew angle comprises:

means for calculating a histogram using a plurality of calculated regression coefficients; and means for determining the skew angle using the calculated histogram.

15. A system as recited in claim 14, further comprising:

means for calculating a correlation coefficient of a plurality of sets of sampling data using the sampling points;

wherein the means for calculating the histogram calculates a weighted histogram using the correlation coefficients of the plurality of sets of sampling data.

16. A system as recited in claim 12, further comprising a scanner for generating the document image;

irradiating the page of the document with a light source.

17. A system as recited in claim 12, wherein the means for determining sampling points determines sampling points which are located at a boundary of a black pixel and a white pixel of the document image.

18. A system as recited in claim 12, wherein said means for determining sampling points determines the sampling points using characters of the document image.

19. A method for detecting a skew angle, comprising the steps of:

scanning a page of a document and generating a document image;

determining if a skew angle of the document image can be determined using ruled lines of the document image;

determining the skew angle of the document image using the ruled lines of the document image, when the skew angle of the document image can be determined using ruled lines of the document image; and determining the skew angle of the document image using character information, when the skew angle of the document image cannot be determined using the ruled lines of the document image.

20. A system for detecting a skew angle, comprising:

a scanning device which scans a page of a document and generates a document image;

means for determining if a skew angle of the document image can be determined using ruled lines of the document image;

means for determining the skew angle of the document image using the ruled lines of the document image, when the skew angle of the document image can be determined using ruled lines of the document image; and means for determining the skew angle of the document image using character information, when the skew angle of the document image cannot be determined using the ruled lines of the document image.

21. A method for detecting a skew angle, comprising the steps of:

scanning a page of a document and generating a document image;

determining coordinates for characters of the document image which correspond on a one-to-one basis with the characters of the page;

determining sampling points of the document image using the coordinates which have been determined;

calculating a regression coefficient of the sampling points; and determining the skew angle of the document image using said regression coefficient.

22. A method according to claim 21, wherein said step of determining coordinates comprises:

determining rectangles, which correspond on a one-to-one basis with the characters, the rectangles circumscribing each of the characters; and determining the coordinates of the characters using the rectangles.

23. A method according to claim 22, wherein the step of determining the coordinates of the characters using the rectangles includes:

determining the coordinates of the characters using a corner of the rectangles.

24. A method according to claim 23, wherein the step of determining the coordinates of the characters using the rectangles includes:

determining the coordinates of the characters using an upper left-hand corner of the rectangles.

25. A system for detecting a skew angle of a page, comprising:

means for determining coordinates for characters of the page which correspond on a one-to-one basis with the characters of the page;

means for determining sampling points of the page using the coordinates which have been determined;

means for calculating a regression coefficient of the sampling points; and means for determine the skew angle of the page using said regression coefficient.

26. A system according to claim 25, wherein the means for determining coordinates comprises:

means for determining rectangles, which correspond on a one-to-one basis with the characters, the rectangles circumscribing each of the characters; and means for determining the coordinates of the characters using the rectangles.

27. A system according to claim 26, wherein the means for determining the coordinates of the characters using the rectangles includes:

means for determining the coordinates of the characters using a corner of the rectangles.

28. A system according to claim 27, wherein the means for determining the coordinates of the characters using the rectangles includes:

means for determining the coordinates of the characters using an upper left-hand corner of the rectangles.

* * * * *